US010008941B1

(12) United States Patent
Radic et al.

(10) Patent No.: US 10,008,941 B1
(45) Date of Patent: Jun. 26, 2018

(54) AUXILIARY POWER SUPPLY FOR SWITCH-MODE POWER SUPPLIES

(71) Applicant: Appulse Power Inc., Toronto (CA)

(72) Inventors: Aleksandar Radic, Toronto (CA); Seyed-Behzad Mahdavikhah-Mehrabad, Toronto (CA)

(73) Assignee: Appulse Power Inc., Toronto (CA)

( * ) Notice: Subject to any disclaimer, the term of this patent is extended or adjusted under 35 U.S.C. 154(b) by 0 days. days.

(21) Appl. No.: 15/387,789

(22) Filed: Dec. 22, 2016

(51) Int. Cl.
*H02M 3/335* (2006.01)
*H02M 1/32* (2007.01)
*H02M 1/36* (2007.01)

(52) U.S. Cl.
CPC ......... *H02M 3/33507* (2013.01); *H02M 1/32* (2013.01); *H02M 1/36* (2013.01)

(58) Field of Classification Search
CPC ............ H02M 3/22; H02M 3/24; H02M 3/28; H02M 3/325; H02M 3/285; H02M 3/156; H02M 1/32; H02M 1/34; H02M 1/36; H02M 1/4258; H02M 2001/0032; H02M 2001/0045; H02M 2001/0048; H02M 2001/0051; H02M 2001/0054; H02M 2001/342; H02M 2001/344; H02M 2001/346; H02M 2001/348; H02M 7/00; H02M 7/02; H02M 7/04; H02M 7/12; H02M 7/125; H02M 7/21; H02M 7/217; Y02B 70/10; Y02B 70/14; Y02B 70/1491; Y02B 70/1433
USPC .......... 363/15, 20–21.18, 37, 40–43, 49, 50, 363/55–56.12, 64, 65, 71, 89, 95–99, 123, 363/124, 131–134; 323/222–226, 247, 323/251, 268–276, 282–289, 311, 312,
(Continued)

(56) References Cited

U.S. PATENT DOCUMENTS

| 6,233,165 B1 * | 5/2001 | Irissou ................ H02M 3/335 363/21.07 |
| 8,836,236 B1 * | 9/2014 | Chiang .............. H05B 33/0845 315/257 |

(Continued)

FOREIGN PATENT DOCUMENTS

WO 2016/101058 6/2016

OTHER PUBLICATIONS

Radic, Aleksandar et al.; High-Power Density Hybrid Converter Topologies for Low-Power Dc-Dc SMPS; The 2014 International Electronics Conference; May 18, 2014.

(Continued)

*Primary Examiner* — Timothy J Dole
*Assistant Examiner* — Carlos Rivera-Perez
(74) *Attorney, Agent, or Firm* — The Mueller Law Office, P.C.

(57) ABSTRACT

A combined voltage regulator and snubber circuit generally has a voltage regulator device in parallel with the energy storage element of the snubber circuit operatively connectable in series with a leakage inductance current path; the leakage inductance being part of a magnetic component utilized in a switch-mode power supply having an input voltage source, controllable semiconductor switches, freewheeling semiconductor switches, feedback controller, reactive energy storage components and a load; the voltage regulator generally providing constant or variable voltage to the gate driver of the controllable semiconductor and/or feedback controller.

7 Claims, 7 Drawing Sheets

(58) Field of Classification Search
USPC ......... 323/351, 901, 908; 315/283–286, 289, 315/290
See application file for complete search history.

(56) References Cited

U.S. PATENT DOCUMENTS

| | | | |
|---|---|---|---|
| 2014/0232270 A1* | 8/2014 | Kimura | H05B 33/0815 315/122 |
| 2015/0171757 A1 | 6/2015 | Jin et al. | |
| 2015/0381031 A1 | 12/2015 | Ghosh et al. | |
| 2016/0226389 A1* | 8/2016 | Quaglino | H02M 3/33592 |
| 2017/0085183 A1* | 3/2017 | Notsch | H02M 3/33507 |

OTHER PUBLICATIONS

International Search Report and Written Opinion dated Apr. 9, 2018.

* cited by examiner

AUXILIARY POWER SUPPLY FOR SWITCH-MODE POWER SUPPLIES

TECHNICAL FIELD

Example embodiments generally relate to the field of switch-mode power supplies, and more particularly to the field of high-efficiency high-side auxiliary power supplies and leakage inductance energy recycling.

BACKGROUND

Switch-mode power supplies (SMPS) are power management components in modern electronic devices that provide, among other things, well-regulated power to electronic loads while minimizing the power processing losses and maximizing the SMPS power density. Some solutions provide improved SMPS switching frequency and semiconductor technologies. These solutions may suffer from diminishing returns and/or prohibitive cost.

While the series-input architectures enable power density and power processing efficiency, these architectures usually require at least one high-side gate-driver and an associated auxiliary power supply. These additional circuits contribute to an increased bill-of-material, component count, quiescent current and potentially decreased reliability.

Additional difficulties may be appreciated in view of the Detailed Description of Example Embodiments, herein below.

SUMMARY

In accordance with an example embodiment, there is provided a normally on switch and associated turn-off circuit for further reducing the auxiliary power supply losses, having automatic turn-off capabilities during light-to-heavy output load power operating conditions. The turn-off circuit dynamically turns off the normally on switch as soon as the snubber energy storage element has sufficient voltage to power the voltage regulator and its downstream loads. As a result, the normally on switch conductions losses are reduced improving the SMPS power processing efficiency during all but the ultra-light load operating conditions.

In accordance with an example embodiment, there is provided a combined voltage regulator and snubber circuit which generally has a voltage regulator device in parallel with the energy storage element of the snubber circuit operatively connectable in series with a leakage inductance current path; the leakage inductance being part of a magnetic component utilized in a switch-mode power supply having an input voltage source, controllable semiconductor switches, freewheeling semiconductor switches, feedback controller, reactive energy storage components and a load; the voltage regulator generally providing constant or variable voltage to the gate driver of the controllable semiconductor and/or feedback controller.

In an example embodiment, there may be provided a switch-mode power supply comprising: a transformer having a least one transformer input and a load output, a converter cell, a low-dropout regulator, and an auxiliary winding. The converter cell may comprise: an input capacitor, a snubber circuit, the transformer input for a transformer connects in parallel with the snubber circuit, a switch driven by a gate driver and controlling the current through the transformer input, and a voltage regulator having an input and a regulated output. The snubber circuit may comprise an energy storage device and a reverse-biased diode connected in series with the energy storage device. The regulated output of the voltage regulator may connect to the voltage rails of the gate driver. The input of the voltage regulator may connect in parallel across the snubber circuit. The auxiliary winding on the at least one transformer input may provide an auxiliary voltage to a low-dropout regulator providing power to the input capacitor.

In another example embodiment, the switch-mode power supply may comprise one or more additional converter cells having the input of the voltage regulator of each additional converter cell connecting in parallel to a prior transformer input of a prior converter cell. A final converter cell may comprise the snubber circuit of the final converter cell having a resistive element in parallel with an energy storage device of the final converter cell.

In any or all of the example embodiments, the energy storage device may comprise a capacitor. A load may be connected to the load output of the transformer. A feedback controller may monitor the load output of the transformer in comparison to a reference voltage. The feedback controller may comprise a subtraction block, a compensator, and a multiple-output pulse-width modulator (MPWM) generator controlling the gate driver of the converter cell. The voltage regulator may be selected from: a switch-mode power supply, linear dropout regulator, switched-capacitor converter, shunt voltage regulator, series voltage regulator, or any combination thereof.

In any or all of the example embodiments, the voltage regulator may comprise a voltage blocking device, connecting the input and regulated output; a feedback control circuit, connecting the input port and a control port of the voltage blocking device; and a voltage reference circuit, connecting the voltage blocking device and a relative zero potential point. The voltage blocking device may comprise a NPN BJT semiconductor transistor. The feedback control circuit may be selected from at least one of a resistor, a semiconductor transistor, a start-up voltage regulator, and/or a combination thereof. The voltage reference circuit may be a combination of a current independent and a current dependant voltage reference. The current independent voltage reference may be selected from at least one of a Zener diode, a forward biased diode, or a combination thereof. The current dependent voltage reference may be selected from at least one of a resistor, a thermistor, and/or a combination thereof.

In accordance with another example embodiment, there is provided a switch-mode power supply that may comprise a transformer having at least one transformer input and a load output connected to a load, a plurality of converter cells, a low-dropout regulator, and an auxiliary winding. The plurality of converter cells may be connected to each other and configured to receive a voltage input and provide a regulated output to one of the at least one transformer inputs. At least one of the plurality of converter cells may comprise an input capacitor across the voltage input of the converter cell, a snubber circuit comprising an energy storage device and a reverse-biased diode connected in series with the energy storage device, one of the transformer inputs connected in parallel with the snubber circuit, a switch driven by a gate driver and controlling the current through the connected transformer input, and a voltage regulator having an input and a regulated output. The regulated output of the voltage regulator may connect to the voltage rails of a gate driver. The input of the voltage regulator for at least one converter cell may connect across the transformer input of a prior converter cell. The input of the voltage regulator for the last converter cell may connect in parallel across the snubber circuit for the last converter cell. The auxiliary winding on the at least one transformer input may provide an auxiliary voltage to a low-dropout regulator providing power to the input capacitor of at least one of the converter cells.

In accordance with any or all of the example embodiments, the snubber circuit of the first converter cell may comprise a resistive element in parallel with the energy storage device of the first converter cell. The energy storage device may comprises a capacitor. A load may be connected to the load output of the transformer. A feedback controller may monitor the connected load output of the transformer in comparison to a reference voltage. The feedback controller may comprise a subtraction block, a compensator, and a multiple-output pulse-width modulator (MPWM) generator controlling the gate driver of each converter cell.

According to yet another example embodiment, there is provided a method for a power efficiency of a switched-mode power supply having a voltage regulator. A source input power may be received from a transient energy storage element, an always energized energy storage element, or a combination thereof. The source input power may be directed from the always energized energy storage element when the transient energy storage element is discharged and/or the source input power may be directed from the transient energy storage element when the transient energy storage element is available. A regulated voltage output may be generated from the source input power suitable for use by a transformer providing an output power to a high-side electric load, a low-side electric load, and/or a combination thereof. The transient energy storage element may comprise a snubber energy element receiving a leakage inductance energy from the transformer. The always energized energy storage element may be a capacitor-divider.

According to any or all of the example embodiments, the switched-mode power supply may comprise at least one of a multi-winding flyback converter or a stacked flyback cell converter.

Other features and variations of the example embodiments described herein may become apparent to one of skill in the art on reading the present disclosure. The example embodiments herein are meant to be illustrative and not limiting.

BRIEF DESCRIPTION OF THE FIGURES

In the figures.

These drawings depict exemplary embodiments for illustrative purposes, and variations, alternative configurations, alternative components and modifications may be made to these exemplary embodiments.

Like reference numerals may be used throughout the Figures to denote similar elements and features.

DETAILED DESCRIPTION OF EXAMPLE EMBODIMENTS

In accordance with example embodiments, there is provided a normally on switch and associated turn-off circuit for further reducing the auxiliary power supply losses, having automatic turn-off capabilities during light-to-heavy output load power operating conditions. The turn-off circuit dynamically turns off the normally on switch as soon as the snubber energy storage element has sufficient voltage to power the voltage regulator and its downstream loads. As a result, the normally on switch conductions losses are reduced improving the SMPS power processing efficiency during all but the ultra-light load operating conditions.

Figure 1:
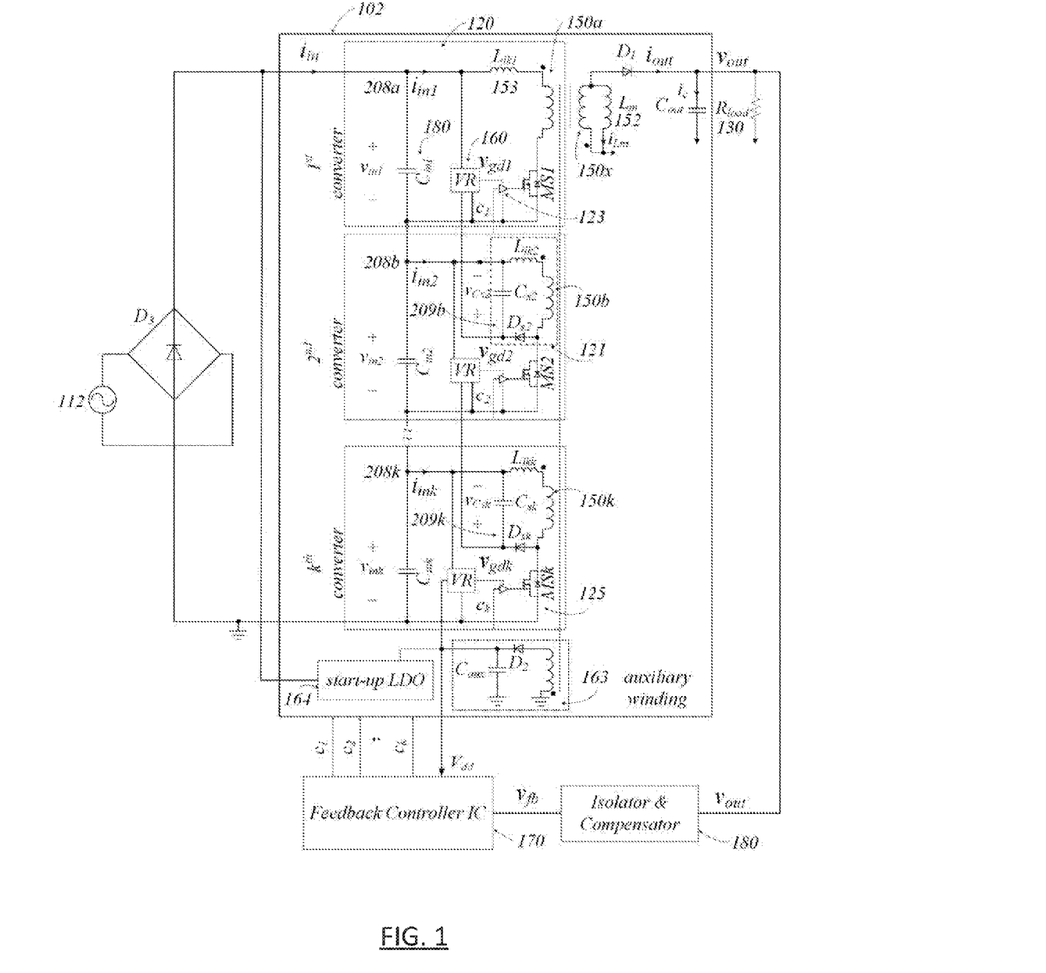
FIG. 1 is a schematic diagram of a multi-winding flyback converter utilizing capacitor-diode (CD) snubbers and two-port bi-directional voltage regulators connected to capacitive-divider input capacitors and snubber energy storage elements in accordance with an example embodiment.

FIG. 1 is an example of a multi-winding flyback converter 102 for converting alternating current (AC) to direct current (DC). The multi-winding flyback converter 102 electrically connects a primary side of a string of serially connected flyback converter cells 120 to a source input power 112 such as AC voltage source 112. Each of the primary side flyback converter cells 120 contain a two-port bi-directional voltage regulator 160, gate driver 123, a CD snubber circuit 121, primary-side transformer winding 150, and semiconductor switch 125. The individual converter cell windings (e.g. primary windings 150a, 150b, . . . , 150k, secondary winding 150x) are coupled to the windings of other flyback converter cells 120 through a single transformer core 152.

In addition, the bottom converter cell 120 voltage regulator 160 receives a transient energy from auxiliary voltage $V_{aux}$ from an auxiliary winding 163. The auxiliary winding 163 comprises an auxiliary diode $D_2$ and capacitor circuit $C_{aux}$. A start-up LDO 164 is connected to the first converter cell 120 (e.g. at the top-most capacitive-divider node) and is also connected to the auxiliary winding 163. Also, the top converter cells 120 use the voltage CD snubber 121 of neighbouring converter cells 120 below. The snubber 121 capacitive energy may be recycled instead of dissipated via the regulated output voltage rail of the voltage regulator 160 and/or the bi-directional, normally-on switch.

The secondary side port 300 of the multi-winding flyback converter 102 is, in turn, connected in to an output load 130 providing an output voltage $V_{out}$. The output voltage $V_{out}$ is sensed and isolated from the primary side via an isolator and compensator block 180 to produce a control signal $v_{fb}$. The control signal $v_{fb}$ is passed to a feedback control integrated circuit (IC) 170 that generates a SMPS switch on-off control action with a duty-ratio relative to the analog value of the control signal.

Figure 2:
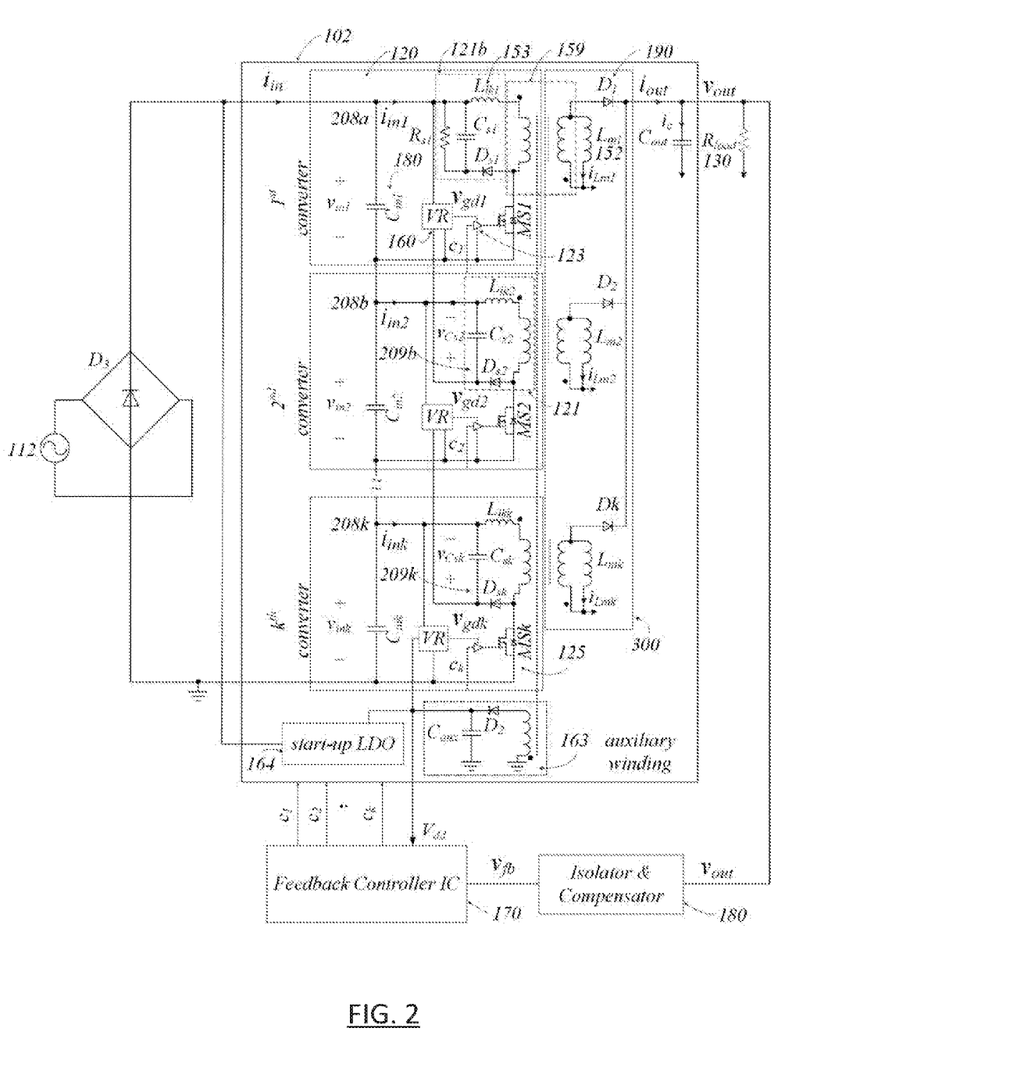
FIG. 2 is a schematic diagram of a stacked flyback converter utilizing CD snubbers and two-port bi-directional voltage regulators connected to capacitive-divider input capacitors and snubber energy storage elements in accordance with an example embodiment.

FIG. 2 is an example of a stacked flyback converter 100 using multiple two-winding transformers 159 with one per flyback converter cell 120. The output rectification diodes $D_1$ to $D_k$ 190 provide current in parallel to the output capacitor $C_{out}$ and load 130. The top stacked flyback converter cell 120, in this example, uses a resistor-capacitor-diode (RCD) snubber circuit 121b in order to clamp the semiconductor switch 125 peak voltage. Similar to the multi-winding flyback converter 102, the stacked flyback converter 100 also has the bottom converter cell 120 voltage regulator 160 receives an auxiliary voltage $V_{aux}$ from the auxiliary winding 163. The start-up LDO 164 is connected to the first converter cell 120 (e.g. at the top-most capacitive-divider node) and is also connected to the auxiliary winding 163.

Figure 3:
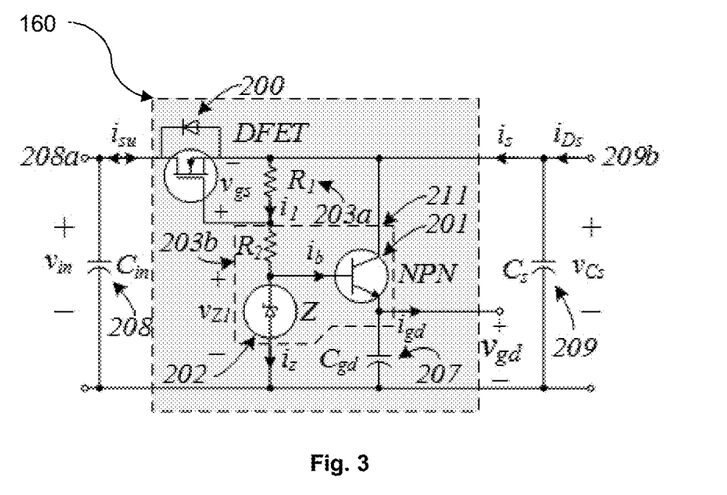
FIG. 3 is a two-port bi-directional voltage regulator circuit with normally on depletion mode FET, resistive-divider based turn-off control circuit and series voltage regulator, in accordance with an example embodiment.

FIG. 3 is an example of a two-port bi-directional voltage regulator 160 that may be used in FIG. 1 or FIG. 2. The drain of the depletion mode n-type FET 200 is connected via 208 to the higher potential node 208a,b, . . . , k of the flyback converter cell 120 capacitive-divider energy storage $C_{in}$. The source of the depletion mode n-type FET 200 is connected at 209 to the higher potential node of the snubber capacitive storage element. A series voltage regulator 211 and depletion mode n-type FET (DFET) turn-off circuit is provided by a resistive divider, formed by $R_1$ 203a and $R_2$ 203b, a voltage reference circuit Z 202 (e.g. zener diode), and voltage blocking device 201 (e.g. NPN BJT) and are connected in parallel with the snubber capacitive energy-storage element. The series voltage regulator has a decoupling capacitor 207 connected in parallel with its output node.

Figure 4:
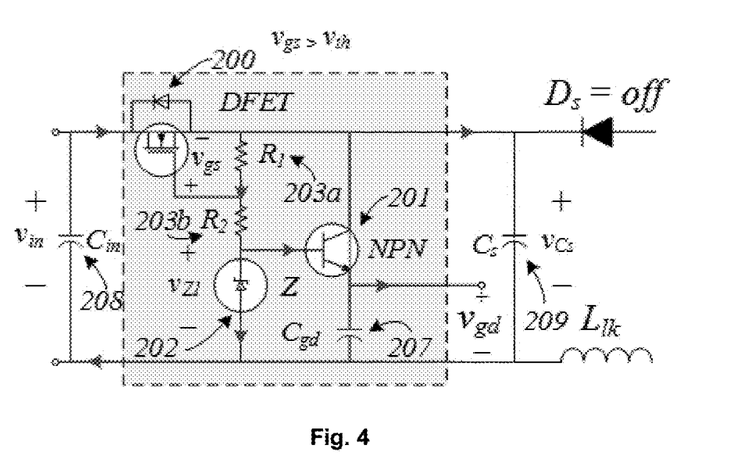
FIG. 4 is the two-port bi-directional voltage regulator circuit of FIG. 3 whose mode of operation is highlighted for start-up and ultra-light load conditions, where power to the series voltage regulator load is being provided from the input capacitive-divider energy storage element, in accordance with an example embodiment.

The voltage regulator 160 may provide a path for power to flow from the input capacitive-divider energy storage element 208, to the series voltage regulator load, such as a gate driver 123 of FIGS. 1 and 2, during SMPS start-up or during periods when the snubber capacitive energy element 209 does not have sufficient energy. The current path during these periods is illustrated in FIG. 4 and is valid as long as the gate-source voltage $V_{gs}$ value is greater than the depletion-mode n-type FET 200 threshold voltage value $V_{th}$ (usually between −1V and −2.1V). In other embodiments, the current path may be determined by another method such as the quality or noise of the transient energy storage element. The relationship between the turn-off voltage of the depletion-mode n-type FET 200 and the rest of the voltage regulator 160 components is given by, $$v_{gs}^{off} = v_{gs}^{th} = R_1 \cdot I_1 = R_1 \cdot \frac{v_{Cs} - v_z}{R_1 + R_2} \quad (1)$$

and may determine the turn-off point of the depletion-mode n-type FET 200 to the instant when the snubber energy storage element has a sufficiently large voltage value (e.g. $V_{cs} > V_z$). In such a way, the series voltage regulator may ensure reliable voltage regulation to the gate driver or similar electronic loads during ultra-light load operating conditions while also minimizing the power consumption from the input capacitive-divider energy storage element 208. By selecting the resistive-divider ratio and ensuring the worst-case snubber capacitor voltage is greater than the minimum required by the load connected to the voltage regulator, the source input power is directed from the transient energy storage element when the transient energy storage element has available energy.

Figure 5:
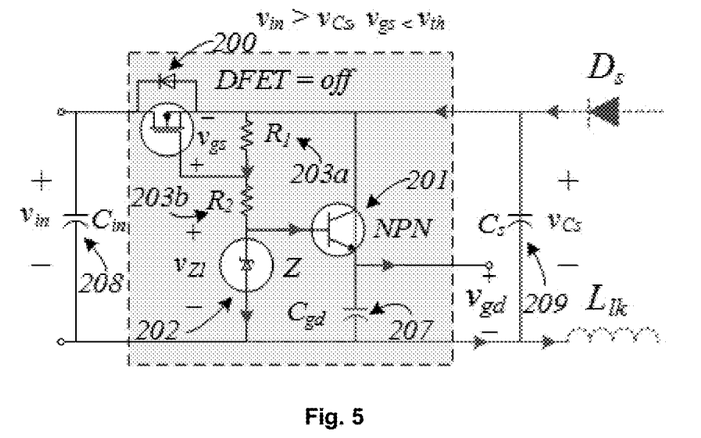
FIG. 5 is the two-port bi-directional voltage regulator circuit of FIG. 3 whose mode of operation is highlighted for light-to-medium load operating conditions, where power to the series voltage regulator load is being provided from the snubber energy storage element, in accordance with an example embodiment.

When the snubber energy element 209 has sufficient voltage to energize the series voltage regulator and its electronic load, the depletion-mode n-type FET 200 turns-off and the voltage regulator 160 power flow path resemble that shown in FIG. 5. The stored leakage inductance 153 energy in the snubber energy element 209 is recycled via the well-regulated series voltage regulator, in the process reducing the SMPS power losses and improving the power processing efficiency. The well-regulated voltage output may be suitable for use by a high-side (e.g. a floating ground) or low-side electric load (e.g. a load that has one node connected to zero potential/common ground).

Figure 6:
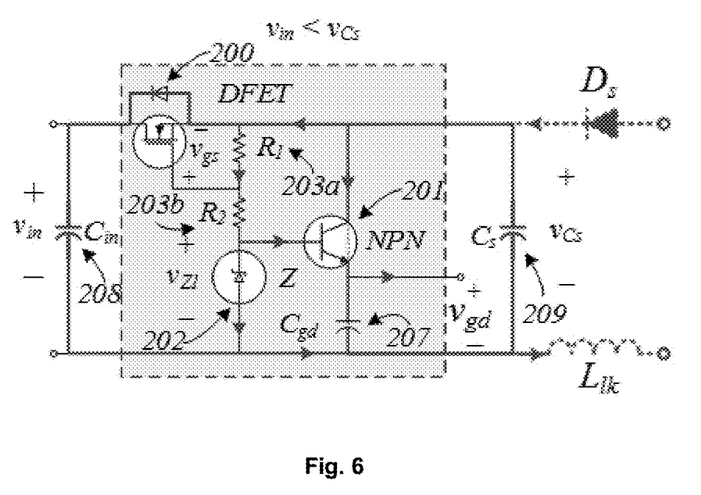
FIG. 6 is the two port bi-directional voltage regulator circuit of FIG. 3 whose mode of operation is highlighted for heavy load operating conditions, where power to the series voltage regulator is being provided from the snubber energy storage element and a portion is being recycled back to the input capacitive-divider energy storage element, in accordance with an example embodiment.

This embodiment allows for increased recycling of the leakage inductance energy during high output power load levels, when the snubber capacitive energy storage element 209 voltage is greater than the input capacitive-divider energy storage element voltage 208. By allowing the excess energy, not being used by the series voltage regulator and its electronic load, to flow into the input capacitive-divider energy storage element 208 via the body-diode of the depletion-mode n-type FET 200 power processing efficiency can be further improved. The power flow paths during this mode of operation are illustrated in FIG. 6.

Figure 7:
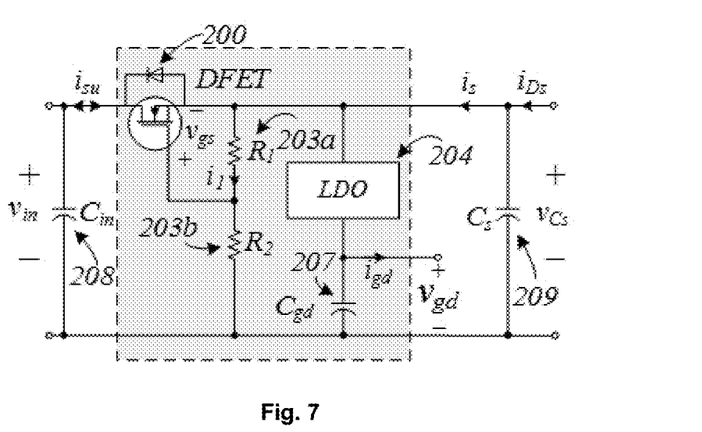
FIG. 7 is a two-port bi-directional voltage regulator circuit with normally on depletion mode FET, resistive-divider based turn-off control circuit and linear dropout regulator, in accordance with an example embodiment.

FIG. 7 is another example of a two-port bi-directional voltage regulator which is adapted to utilize a low-dropout linear regulator 204 instead of a series voltage regulator 211 of FIG. 3. All other components are similar to the previously described examples above.

Figure 8:
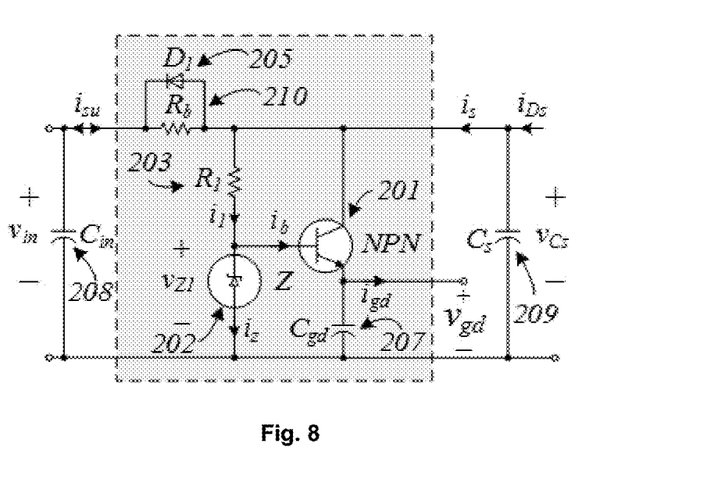
FIG. 8 is a two-port bi-directional voltage regulator circuit with a bleeding resistor, energy recycling diode and series voltage regulator, in accordance with an example embodiment.

FIG. 8 is another example of a two-port bi-directional voltage regulator which is adapted to utilize a resistor 210 and parallel diode 205 instead of a depletion mode FET 200 of FIG. 3 for start-up power delivery and energy recycling. All other components are similar to the previously described examples above.

Figure 9:
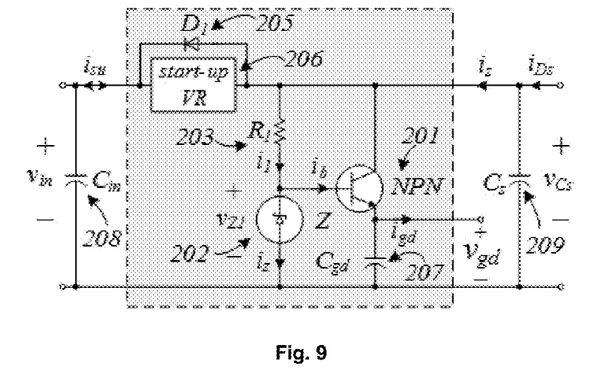
FIG. 9 is a two-port bi-directional voltage regulator circuit with a start-up voltage regulator, energy recycling diode and series voltage regulator, in accordance with an example embodiment.

FIG. 9 is another example of a two-port bi-directional voltage regulator which is adapted to utilize a start-up voltage regulator 206 and diode 205 instead of a depletion mode FET 200 of FIG. 3 for start-up power delivery and energy recycling. All other components are similar to the previously described examples above.

Figure 10:
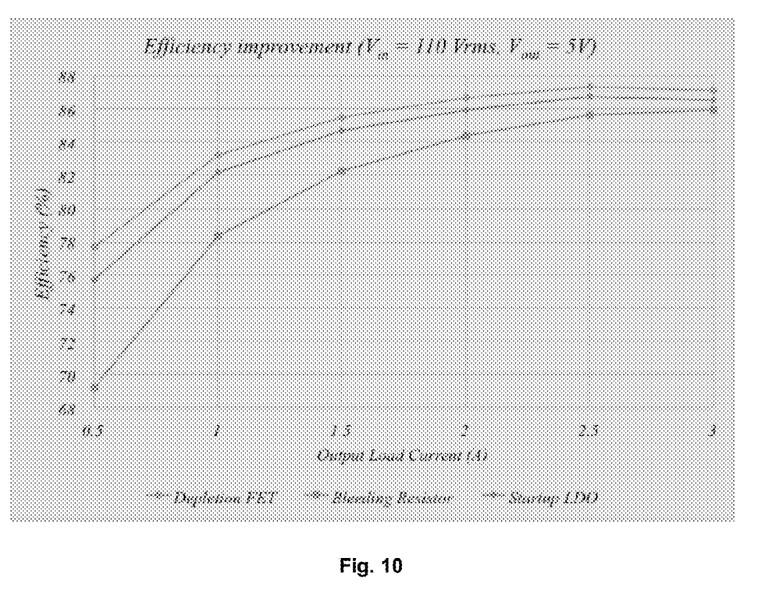
FIG. 10 is a graph showing the evolution of the power processing efficiency as a function of output load current level for experimental multi-winding flyback converters from FIG. 1, in accordance with an example embodiment.

Measured power processing efficiency for a 110 Vrms to 5V experimental multi-winding flyback converter, using the depletion-mode normally on two-port voltage regulator 160 shown in FIG. 3 or FIG. 7, is presented in FIG. 10. For comparison purposes the power processing efficiency of two additional multi-winding flyback converters, one using a bleeding resistor 210 and diode 205 circuit, shown in FIG. 8, and the other using a start-up voltage regulator 206 and diode 206 circuit, shown in FIG. 9, instead of the depletion mode FET 200, are included in the comparison. The measured power processing efficiency at maximum power is best in class (typical <85%), regardless of the proposed two-port voltage regulator 160 practical implementation.

Figure 11:
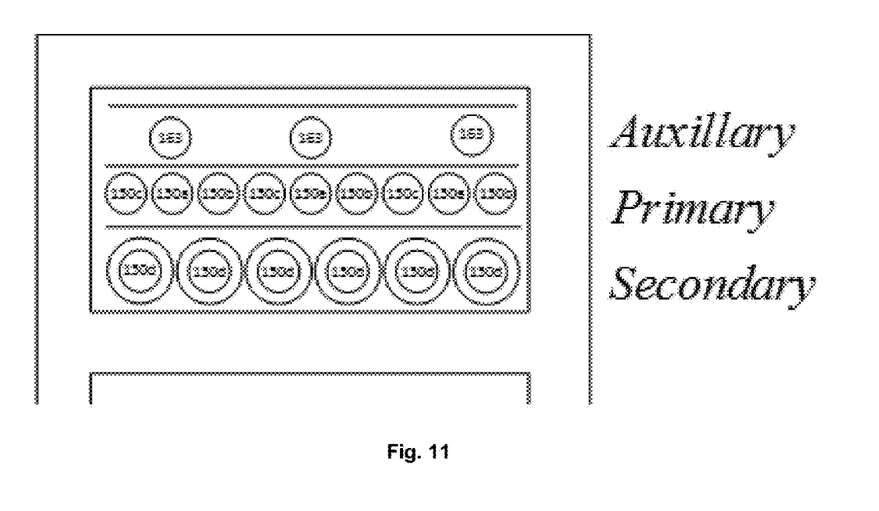
FIG. 11 is a depiction of a multi-winding flyback transformer winding stack-up, used in converters shown in FIG. 1, with an optimized trifilar primary winding structure enabling reduced leakage inductance power losses.

FIG. 11 is a depiction of the multi-winding transformer winding structure that may enable the reduction of power losses due to the transformer leakage inductance energy in converters similar to that shown in FIG. 1. The primary side winding 150 with the highest coupling to the other primary side windings 150, usually the middle primary-side winding 150a, is connected to the top flyback converter cell 120. Since the top flyback converter cell 120 does not have a mechanism to recycle the leakage inductance 153 energy, unlike the bottom flyback converter cells 120, the leakage inductance power losses may be minimized.

The example embodiments may provide an alternative method for the voltage regulator to be powered during SMPS start-up or periods when the leakage inductance energy is insufficient to power the voltage regulator load, through the capacitive-divider energy storage port and the normally on switch path. In such a way, reliable operation of the voltage regulator load may be ensured even under no load operating conditions.

Although particular examples of the multi-winding flyback converter 102 and stacked flyback converter 100, the example embodiments described herein may be applied to converters, such as described in U.S. patent application Ser. No. 15/209,184, herein expressly incorporated by reference in its entirety.

In the embodiments described herein, the energy storage devices, such as capacitors and/or inductors, may be provided in the form of discrete circuit elements or may be integrated in an integrated circuit.

Although the embodiments described herein disclose a depletion-mode n-type FET 200, other embodiments may comprise a gallium nitride semiconductor switch and/or a bleeding resistor or similar device.

Although particular voltage regulators are described with reference to the examples herein, other embodiments may comprise a shunt voltage regulator, a series voltage regulator, a miniature SMPS, a low-dropout regulator, a switched-capacitor converter, and/or similar device. The output of the voltage regulator may be connected to the load via a floating semiconductor switch gate driver, control circuit, or similar device.

Variations may be made to some example embodiments, which may include combinations and sub-combinations of any of the above. The various embodiments presented above are merely examples and are in no way meant to limit the scope of this disclosure. Variations of the example embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A switch-mode power supply comprising:
   a transformer having at least two transformer inputs and a load output;
   a plurality of converter cells connected to each other and configured to receive a voltage input, at least one of the plurality of converter cells comprising:
   an input capacitor across the voltage input of the converter cell,
   a snubber circuit comprising an energy storage device and a reverse-biased diode connected in series with the energy storage device, one of the transformer inputs connected in parallel with the snubber circuit,
   a switch driven by a gate driver and controlling a current through the transformer, and
   a voltage regulator having a plurality of voltage regulator inputs and a regulated output; the regulated output of the voltage regulator connects to voltage rails of a gate driver, a first voltage regulator input among the plurality of voltage regulator inputs for a first converter cell among the plurality of converter cells connects across the input capacitor, and a second voltage regulator input among the plurality of voltage regulator inputs for a second converter cell among the plurality of converter cells connects in parallel across the snubber circuit for of a prior converter cell among the plurality of converter cells;
   a low-dropout regulator, and
   an auxiliary winding on the at least one transformer input for providing an auxiliary voltage to the low-dropout regulator for providing power to the voltage regulator of the at least one of the converter cells.

2. The switch-mode power supply according to claim 1, wherein the snubber circuit of the first converter cell comprises a resistive element in parallel with the energy storage device of the first converter cell.

3. The switch-mode power supply according to claim 1, wherein the energy storage device comprises a capacitor.

4. The switch-mode power supply according to claim 1, further comprising a load connected to the load output of the transformer.

5. The switch-mode power supply according to claim 4, further comprising a feedback controller monitoring the connected load output of the transformer in comparison to a reference voltage.

6. The switch-mode power supply according to claim 5, the feedback controller comprising a subtraction block, a compensator, and a multiple-output pulse-width modulator (MPWM) generator controlling the gate driver of each converter cell.

7. A switch-mode power supply comprising:
   a transformer having at least two transformer inputs and a load output;
   a converter cell, the converter cell comprising:
   a converter cell input capacitor;
   a snubber circuit comprising an energy storage device and a diode connected in series with the energy storage device, wherein a first transformer input among the at least two transformer inputs is connected in parallel with the snubber circuit;
   a switch driven by a gate driver and controlling a current through the first transformer input; and
   a voltage regulator having two inputs and a regulated output, the regulated output of the voltage regulator connected to the gate driver, one input of the voltage regulator connected in parallel across a snubber circuit of a previous converter cell, another input of the voltage regulator connected in parallel across the converter cell input capacitor;

a low-dropout regulator; and an auxiliary winding on the at least one transformer input for providing an auxiliary voltage to the low-dropout regulator for providing power to the voltage regulator of a low-side converter cell voltage regulator.

* * * * *

UNITED STATES PATENT AND TRADEMARK OFFICE
CERTIFICATE OF CORRECTION

PATENT NO.        : 10,008,941 B1
APPLICATION NO.   : 15/387789
DATED             : June 26, 2018
INVENTOR(S)       : Aleksandar Radic and Seyed-Behzad Mahdavikhah-Mehrabad It is certified that error appears in the above-identified patent and that said Letters Patent is hereby corrected as shown below:

In the Claims

Claim 1, Column 8, Line 32, delete "one" and insert --two--.
Claim 7, Column 9, Line 7, delete "one" and insert --two--.

Signed and Sealed this
Fourth Day of September, 2018

Andrei Iancu
*Director of the United States Patent and Trademark Office*